March 29, 1938. J. C. McCUNE 2,112,423
BRAKING APPARATUS
Filed Feb. 1, 1936 3 Sheets-Sheet 1

Fig.1

INVENTOR
JOSEPH C. McCUNE
BY Wm. H. Cady
ATTORNEY

March 29, 1938.  J. C. McCUNE  2,112,423
BRAKING APPARATUS
Filed Feb. 1, 1936  3 Sheets-Sheet 2

INVENTOR
JOSEPH C. McCUNE
BY Wm. M. Cady
ATTORNEY

March 29, 1938.          J. C. McCUNE          2,112,423
BRAKING APPARATUS
Filed Feb. 1, 1936          3 Sheets-Sheet 3

INVENTOR
JOSEPH C. McCUNE.
BY  Wm. M. Cady
ATTORNEY

Patented Mar. 29, 1938

2,112,423

UNITED STATES PATENT OFFICE 2,112,423

BRAKING APPARATUS

Joseph C. McCune, Edgewood, Pa., assignor to The Westinghouse Air Brake Company, Wilmerding, Pa., a corporation of Pennsylvania Application February 1, 1936, Serial No. 61,961

26 Claims. (Cl. 303—3)

This invention relates to brake equipments, and more particularly to brake equipments for high speed trains and traction vehicles.

In the design of high speed trains and traction vehicles intended for city and suburban use great care is taken to produce quiet operation. One means employed to accomplish this is the provision of rubber inserts in the wheels so as to mechanically insulate the wheel treads from the wheel hubs, and thereby minimize the amount of noise which is transmitted to the body proper. Where such rubber inserts are used in the wheels the braking which may be permitted on the wheel treads must be limited, because if the wheel treads become overheated the rubber insulation may be wholly destroyed.

In order to secure adequate braking during normal stops, other means than the commonly employed shoe-on-wheel-type of brakes must be used. In this connection it has been found desirable to employ both magnetic track brakes and dynamic brakes, the latter utilizing the driving motors, as is well understood in the art.

While magnetic track brakes and dynamic brakes alone may be employed when making normal stops, shoe-on-wheel-brakes, preferably of the fluid pressure operated type, must be provided to insure stopping of the train or vehicle upon failure of either or both of the electric types of brakes. In addition, since the effectiveness of the dynamic brakes diminishes at low speeds, it is desirable that the fluid pressure brakes be cut into action at or about the time the dynamic brakes diminish in effectiveness, so as to insure stopping and holding of the train or vehicle at rest.

It is a principal object of the present invention to provide an improved brake equipment employing fluid pressure brakes, magnetic track brakes, and dynamic brakes, in which the magnetic track brakes and dynamic brakes alone are employed for making normal stops, with the fluid pressure brakes held suppressed until the effectiveness of the dynamic brakes diminishes below a predetermined value, at which time the fluid pressure brakes are applied.

While it is desirable that the fluid pressure brakes be suppressed when making normal stops, in order to prevent injury to the rubber inserts in the wheels, it is also desirable that means be provided for applying the fluid pressure brakes as well as the magnetic track and dynamic brakes when making emergency stops. It is therefore accordingly a further important object of the present invention to provide a brake equipment of the type referred to in the foregoing object, which in addition provides for application of all three of the aforementioned brakes when effecting an emergency application.

Safety considerations require that means be provided for effecting an application of the brakes on a vehicle when the operator thereof becomes incapacitated to perform his regular duties. Such means is commonly referred to as "deadman control". It is a further object of the present invention to provide an improved brake equipment of the type hereinbefore referred to which has incorporated therein deadman control features.

In the design of a brake equipment of the type hereinbefore referred to, experience has taught the desirability of incorporating in such an equipment a number of desirable structural and operative features, and it is a further object of the present invention to incorporate a number of such features in a brake equipment of the type herein disclosed. The specific features included will be hereinafter more fully referred to and described.

A more complete understanding of the invention will be obtained from the following description, which is taken in connection with the attached drawings, wherein.

Figure 1:
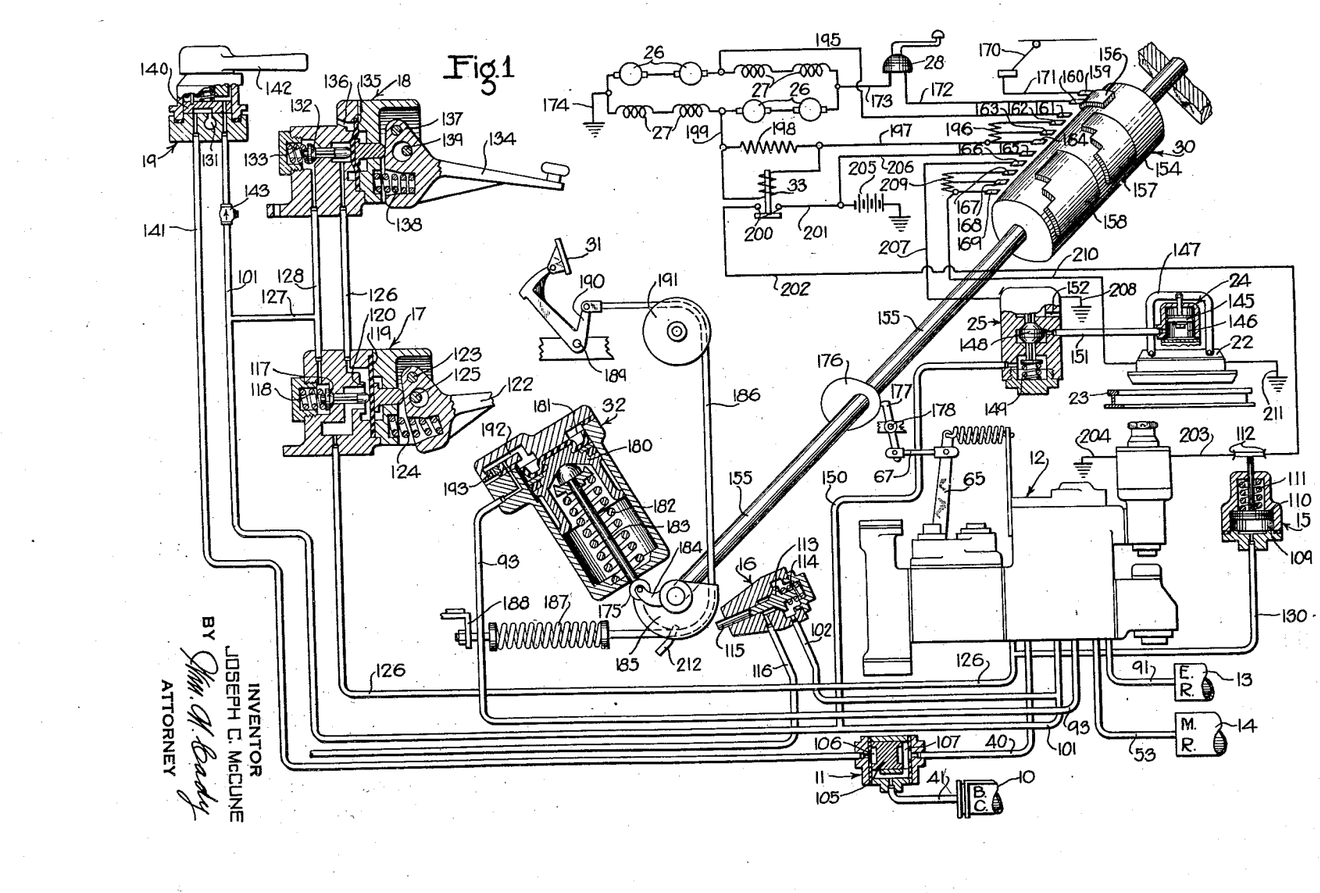
Fig. 1 is a schematic and diagrammatic view of one embodiment of the invention adapted for a single vehicle.

Referring now briefly at first to the embodiment shown in Fig. 1, the fluid pressure brake system may comprise a brake cylinder 10, a double check valve device 11, a control valve device 12, an emergency reservoir 13, a main reservoir 14, a fluid pressure operated switch device 15, a foot valve device 17, a hand valve device 18, and a derail throwing brake valve device 19.

The magnetic track brake system may comprise a track brake device 22 suspended above a track rail 23, a raising cylinder 24, and a magnet valve device 25.

The dynamic brake system comprises the vehicle driving motors having armatures 26 and field windings 27, which are adapted to have power supplied thereto by operation of a motor controller 28 when driving the vehicle, and to be connected in a dynamic braking circuit by operation of a controller device 30 when operated as dynamic brakes.

The controller device 30 forms a part of a common control mechanism for controlling applications of all three types of brakes in response to actuation of a service foot pedal 31 or a fluid pressure operated device 32.

In order that the fluid pressure brakes may be suppressed when making normal applications of the brakes, a relay 33 is provided in electrical association with the dynamic brake system, as will be more fully hereinafter described.

Considering now more in detail the apparatus above referred to, while only one brake cylinder 10, one magnetic track brake device 22, and a limited number of vehicle driving motors are shown, it will be apparent that any number of these devices may be employed as dictated by conditions.

Figure 2:
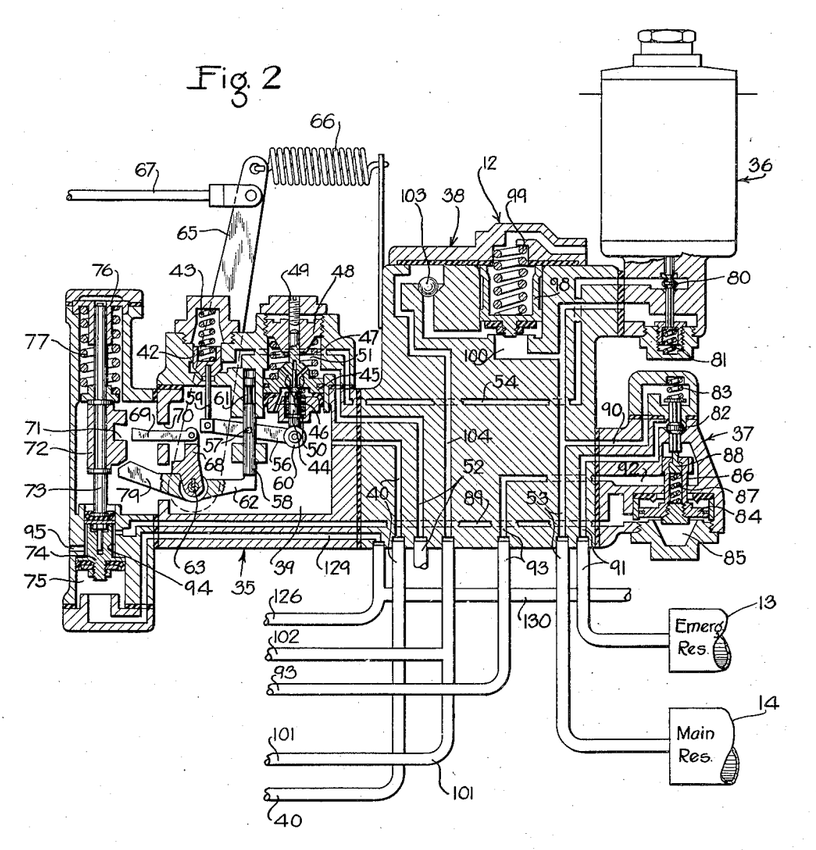
Fig. 2 is a diagrammatic view of the control valve device shown in the lower right hand portion of Fig. 1.

Considering now in detail the control valve device 12, this valve device comprises a self-lapping valve section 35, a suppression magnet valve section 36 and an emergency valve section 37, all of which are secured to a pipe bracket section 38.

The self-lapping valve section 35 is embodied in a casing defining a pressure chamber 39. This chamber is in communication with the brake cylinder 10 by way of pipe and passage 40, double check valve device 11, and pipe 41.

A supply valve 42, normally urged to seated position by a spring 43, is provided for controlling the supply of fluid under pressure to the pressure chamber 39. A release valve 44, carried by a movable abutment 45 in the form of a piston, is provided for controlling the release of fluid under pressure from the chamber 39. The release valve 44 is urged toward unseated position by a spring 46.

The movable abutment 45 is subject on its lower side to pressure of fluid in chamber 39 and on its upper side to pressure of a regulating spring 47. Tension on this spring may be regulated by a regulating member 48, while upward movement of the movable abutment 45 may be limited by a set screw 49.

When the supply valve 42 is seated and the release valve 44 unseated, the pressure chamber 39 is in communication with the atmosphere by way of passages 50, chamber 51, and pipe and passage 52. When the release valve 44 is seated and the supply valve 42 is unseated, fluid under pressure is supplied to the chamber 39 from the main reservoir 14, by way of pipe and passage 53, the suppression magnet valve section 36, and passage 54.

For seating the release valve 44 and unseating the supply valve 42, there is provided a mechanism comprising a lever 56 pivotally carried intermediate its ends at 57 by a plunger 58. At its left end the lever 56 carries a stem 59 which projects into a recess in the supply valve 42. At its right hand end the lever 56 carries a roller 60 which engages the stem of the release valve 44.

The plunger 58 is slidably disposed in a bore 61 and may be actuated upwardly by an arm 62 secured to a shaft 63. When the plunger 58 is actuated upwardly the lever 56 first fulcrums about its left end to seat the release valve 44, against opposition of spring 46, and then fulcrums about its right end to unseat the supply valve 42, against opposition of its spring 43. It is to be here understood that the release valve spring 46 is lighter than the supply valve spring 43, so that this operation may take place. During this operation the regulating spring 47 is unappreciably compressed, because it is considerably heavier than either the release valve spring 46 or the supply valve spring 43.

With the release valve 44 seated and the supply valve 42 unseated fluid under pressure will be supplied to the chamber 39, and as this pressure increases the movable abutment 45 will be actuated upwardly. As the movable abutment moves upwardly the lever 56 will fulcrum about its pivot 57 and rotate in a counterclockwise direction under action of the supply valve spring 43 until the supply valve 42 is seated, at which time the supply of fluid under pressure to the chamber 39 will be lapped. The parts are so designed that the pressure at which the lap operation takes place corresponds to the degree of upward movement of the plunger 58.

The upward movement of the plunger 58 is effected by rotation of a lever 65 also secured to the shaft 63. This lever 65 is biased to a release position by a spring 66, and may be actuated to various application positions by pull exerted on a connected link 67, as will hereinafter be more fully described. It will thus be apparent that the degree of rotation of the lever 65 in a counterclockwise direction determines the degree of upward movement of the plunger 58, and hence the degree of pressure in the pressure chamber 39. Since the chamber 39 is in communication with the brake cylinder 10, it follows that the degree of application of the fluid pressure brakes corresponds to the degree of counterclockwise rotation of the lever 65.

Also secured to the shaft 63 is a short arm 68 having pivotally secured thereto a finger 69 projecting into a slot 70 in the casing. When the shaft 63 is rotated in a counterclockwise direction, the finger 69 drops into a recess 71 of a latch member 72.

The latch member 72 is secured to a shaft 73 which at its lower end abuts against a piston 74. The piston 74 is disposed in a chamber 75 which is normally charged with fluid under pressure, so that the piston 74 is positioned as shown in Fig. 2 to maintain the latch member 72 in the position illustrated.

The upper end of the shaft 73 is slidable in a guide member 76, and a spring 77 reacts between this guide member and the latch member 72 to urge the latch member downwardly. As long as the pressure of fluid supplied to chamber 75 is above a predetermined value the spring 77 will be overcome, but when the pressure is diminished below this predetermined value the spring 77 will actuate the latch member 72 downwardly, unless in the meanwhile the finger 69 has engaged the recess 71 to prevent the downward movement.

If, however, this has not taken place the latch member 72 will engage an arm 79 to rotate the shaft 63 through its full counterclockwise movement, to thus effect a supply of fluid under pressure to the pressure chamber 39 to a maximum degree. When fluid under pressure is again supplied to chamber 75 above the aforementioned predetermined degree the piston 74 will return to the position shown and spring 66 will then return lever 65 to its release position as illustrated.

The suppression magnet valve section 36 is embodied in a casing having a valve 80 urged toward an unseated position by a spring 81 and toward a seated position by an electromagnet (not shown) in the upper part of the valve device casing, which when energized actuates the valve downwardly to seated position.

The emergency valve section 37 is also embodied in a casing and is provided with a double beat valve 82 urged toward lower seated position by a spring 83. A piston 84 disposed in a chamber 85 is adapted upon supply of fluid under pressure to this chamber to actuate the double beat valve 82 to upper seated position. The piston 84 is provided with a hollow stem 86 in which is disposed a spring 87 engaging a plunger 88 in contact with the stem of the double beat valve 82.

When the double beat valve 82 is in the lower seated position, as illustrated, a communication is established between the emergency reservoir 13 and the main reservoir 14, by way of pipe and passage 53, passage 90, past the open upper seat of the double beat valve 82, and pipe and passage 91. When the double beat valve 82 is in its upper seated position this communication is closed and the emergency reservoir 13 is connected to the fluid pressure operated device 32, past the open lower seat of double beat valve 82, chamber 92, and pipe and passage 93.

The double beat valve 82 is actuated to upper seated position when fluid under pressure is supplied to the chamber 85 upon downward movement of the piston 74 in the self-lapping valve section 35. When the piston 74 is in its upper position, as illustrated, the chamber 85 is connected to the atmosphere by way of passage 89, chamber 94 and exhaust port 95. When the piston 74 moves to its lower position this communication to the atmosphere is cut off and passage 89 is opened to chamber 39, so that fluid under pressure flows from this chamber to the piston chamber 85.

In the pipe bracket section 12 is provided a cut-off valve 98 urged toward a seated position by a spring 99. Chamber 100 below the valve 98 is in open communication with the main reservoir 14, and spring 99 above the valve is so designed that as long as main reservoir pressure is above a predetermined value the valve 98 will be held unseated, but when the pressure falls below this chosen value spring 99 will seat the valve 98. The valve 98 controls communication between the chamber 100 and a main reservoir pipe 101, and its branch pipe 102, which communication includes a ball check valve 103 and a passage 104. As will be observed, the ball check valve 103 permits flow of fluid to the main reservoir pipe 101 but prevents flow in the opposite direction.

The double check valve device 11 is embodied in a casing comprising a slide valve 105 subject at its left end to pressure of fluid from a chamber 106 and at its right end to pressure of fluid from a chamber 107. The slide valve 105 will move to the left or right depending upon whether the pressure in chamber 106 or 107 is the greater.

The fluid pressure operated switch device 15 is embodied in a casing having a chamber 109 in which is disposed a piston 110 urged downwardly by a spring 111. When the piston 110 is in its uppermost position a set of contacts 112 are maintained closed, and when the piston 110 is actuated to its lowermost position these contacts are opened.

The sanding valve device 16 is embodied in a casing provided with a valve 113 which is urged toward seated position by a spring 114. The valve 113 is provided with a stem 115 to which pressure may be applied to unseat the valve and thereby establish communication between the main reservoir branch pipe 102 and a sanding pipe 116 to cause sand to be applied to the track rails.

The foot valve device 17 is embodied in a casing provided with a supply valve 117 urged toward a seated position by spring 118, and also with a diaphragm valve 119 coacting with a seat 120. A foot pedal 122 is provided for actuating these two valves. The foot pedal is pivotally mounted to the valve device casing at 123 and is normally urged upwardly by a spring 124. A pin 125 projecting into an aperture limits the up and down movement of the foot pedal 122.

When the foot pedal 122 is in the upper position, as illustrated, spring 118 holds valve 117 seated and diaphragm valve 119 away from its seat 120. This establishes communication between two sections of a safety control pipe 126. When the foot pedal 122 is manually actuated downwardly the diaphragm valve 119 is caused to seat and the supply valve 117 is unseated. This cuts off communication between the two sections of the safety control pipe 126, and establishes communication between the main reservoir pipe 101 and the lower section of the safety control pipe 126, through branch pipes 127 and 128.

It is to be here noted that the safety control pipe 126 is connected to the aforementioned chamber 75 in the control valve device 12 by way of passage 129, and is also connected to the fluid pressure operated switch device 15 by way of branch pipe 130. While the pipe 126 has been specifically referred to as a safety control pipe, it is to be understood that this pipe is similar in function to other normally charged pipes referred to as brake pipe, emergency pipe, or the like.

The hand valve device 18 is embodied in a casing and has parts similar to the foot valve device 17. A supply valve 132 controls communication between the main reservoir branch pipe 128 and the upper section of the safety control pipe 126. This valve is normally urged toward a seated position by spring 133 and is actuated to unseated position by downward movement of a handle 134. When the handle 134 is moved downwardly it effects seating of a diaphragm valve 135 to close communication between the upper section of the safety control pipe 126 and an exhaust port 136.

Like the foot pedal in the foot valve device 17, the handle 134 is pivotally mounted at 137 and is urged upwardly by a spring 138. The up and down movement is limited by a pin 139 projecting into an aperture in the handle.

Figure 3:
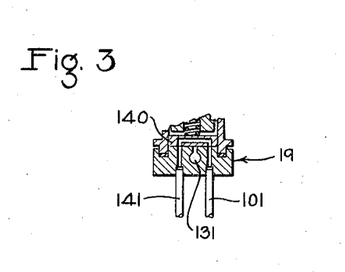
Fig. 3 is a fragmentary diagrammatic view of the derail throwing brake valve device shown to the upper left of Fig. 1.

The derail throwing brake valve device 19 is embodied in a casing and is provided with a rotary valve 140 for controlling communication between the main reservoir pipe 101 and an application pipe 141, and between the application pipe 141 and an exhaust port 131. A handle 142 is provided for rotating the rotary valve 140. When the handle 142 is in release position the pipe 141 is connected to exhaust port 131, as shown in Fig. 1. When the handle 142 is moved to application position the pipe 141 is disconnected from the exhaust port 131 and connected to the main reservoir pipe 101, as illustrated in Fig. 3.

A one-way check valve device 143 is disposed in the main reservoir pipe 101 adjacent the derail throwing brake valve device to permit the flow of fluid toward the brake valve device but to prevent flow in the opposite direction. This check valve device is of the spring loaded type, the spring being designed to limit the pressure of fluid supplied to the derail throwing brake valve device 19 to some value considerably below main reservoir pressure.

The magnetic track brake device 22 may be of any of the types commonly employed for producing track braking. In the embodiment illustrated the track brake device is held suspended above a track rail 23 by a raising cylinder 24, which comprises a piston 145 disposed in a chamber 146, and having a stem attached to a bracket 147 secured to the track brake device 22. When fluid under pressure is supplied to the chamber 146 the piston 145 is actuated upwardly to hold the track brake device suspended above the track rail. When fluid under pressure is released from the chamber 146 the track brake device drops to the rail due to gravity effect.

The magnet valve device 25 controls the supply of fluid under pressure to and its release from the chamber 146. This magnet valve device comprises a double beat valve 148 urged toward an upper seated position by a spring 149, and to a lower seated position by action of an electromagnet in the upper part of the valve device casing which when energized actuates the double beat valve 148 downwardly.

When the double beat valve 148 is in its upper seated position fluid under pressure is supplied from the main reservoir pipe 101 to the chamber 146 by way of pipe 150, past the lower seat of double beat valve 148, and pipe 151. When the double beat valve 148 is in lower seated position this communication is cut off and the chamber 146 is vented to the atmosphere by way of exhaust port 152.

The controller device 30 preferably comprises a drum 154 secured to a shaft 155 and having disposed thereon and insulated therefrom separate contact segments 156, 157 and 158. The segment 156 is adapted to engage contact fingers 159 and 160; the segment 157 is adapted to engage contact fingers 161 to 164 inclusive; and the segment 158 is adapted to engage fingers 165 to 169 inclusive.

When the drum 154 is in release position, as illustrated, segment 156 is in engagement with contact fingers 159 and 160 so that the vehicle driving motors may be connected to a trolley 170. Power may then be supplied to the vehicle driving motors from the trolley 170 by way of conductor 171, contacts 156, 159 and 160, conductor 172, motor controller 28, and conductor 173, the return circuit to the source of power supply being by way of ground connection 174.

When the drum 154 is rotated through a predetermined movement segment 156 disengages from fingers 159 and 160 while at the same time segment 157 engages fingers 161 and 162 and one or both of fingers 163 and 164, depending upon the degree of rotation, while segment 158 engages the three fingers 165, 166 and 167, and one or both of fingers 168 and 169 if the drum is rotated far enough. The purpose of this arrangement will appear more fully from the description of operation which follows hereinafter.

The shaft 155 has disposed thereon a cam 176 which engages one end of a lever 177 pivotally mounted at 178 and having its other end secured to link 67 connected to the aforedescribed lever 65 associated with the control valve device 12. The cam 176 is so designed that as the shaft 155 rotates in a counterclockwise direction the lever 177 is rotated in a clockwise direction to actuate the control valve lever 65 progressively to the left.

The fluid pressure operated device 32 is embodied in a casing and provided with a piston 180 subject on one side to pressure of fluid supplied to a chamber 181 and subject on the other side to pressure from a spring 182 acting through a rod 183.

One end of the rod 183 bears against the piston 180, while the other end engages a roller 175 connected to an arm 184 rigidly secured to the shaft 155. The shaft 155 also has rigidly disposed thereon a sheave or pulley 185 over which passes a cable 186. One end of the cable is fastened to a spring 187 the other end of which is secured to a bracket 188. In the arrangement of the parts illustrated in Fig. 1 the spring 187 is under tension so that the shaft 155 is positioned as shown.

When, however, an upward pull is exerted on the cable 186, or fluid under pressure is supplied to the chamber 181 of the fluid pressure operated device 32, the shaft 155 is rotated in a counterclockwise direction. Upward pull on the cable 186 may be effected by actuation of the foot pedal 31 downwardly. This foot pedal is pivotally mounted at 189 to some portion of the car body and has an extension arm 190 connected to one end of cable 186, the cable passing over an idler pulley 191 for the purpose of changing the direction of the applied force due to depressing the foot pedal 31. It should be obvious from the arrangement shown that the degree to which the shaft 155 is rotated by depressing the foot pedal 31 depends upon the degree to which the foot pedal is depressed.

Now when fluid under pressure is supplied to the chamber 181 of the fluid pressure operated device 32 to a degree such that the opposing force exerted by the spring 182 therein is wholly overcome, the shaft 155 is rotated to its extreme counterclockwise position, which corresponds to the emergency position of the controller device 30, while the cam 176 actuates the control valve device 12 to emergency position, as will more fully hereinafter appear.

Fluid under pressure supplied to the chamber 181 flows to the atmosphere through a passage 192 which contains a choke 193. The choke 193 is designed to gradually vent the chamber 181 to the atmosphere, so that when the fluid pressure operated device 32 actuates the shaft 155 to its emergency position it will maintain it there for a predetermined length of time and then permit spring 187 to return it to release position.

The operation of this embodiment of my invention is as follows:

Running condition

When the vehicle is being driven under power, or coasting, the parts of the brake equipment illustrated are maintained in the positions shown in Fig. 1. It is to be noted that the handle 134 of the hand valve device 18 is held depressed while the foot pedal 122 is permitted to assume its uppermost position. It is to be here understood that while the vehicle is being driven under power, or coasting, that either the handle 134 or the foot pedal 122 must be held depressed by the operator.

With the controller device 30 in the position shown contact segment 156 will connect fingers 159 and 160, so that power may be supplied to the vehicle driving motors through operation of the motor controller 28.

With either or both the handle 134 and the foot pedal 122 held depressed, the safety control pipe 126 will be charged to main reservoir pressure from the main reservoir pipe 101. With the safety control pipe thus charged, piston 74 in the control valve device 12 will be held in its uppermost position, as illustrated in Fig. 2, and contacts 112 of the fluid pressure operated switch device 15 will be maintained closed, as illustrated in Fig. 1.

It will be noted that the emergency reservoir 13 will, for the release positions of the parts shown, be charged from the main reservoir 14 by way of the communication leading past the open upper seat of the double beat valve 82 in the emergency valve section 37.

*Service application*

When it is desired to effect a service application of the brakes, the operator depresses the service foot pedal 31 to a degree according to the desired degree of braking, while at the same time maintaining pressure manually applied to either the handle 134 or the foot pedal 122. Depressing the service foot pedal 31 rotates the shaft 155 correspondingly. As the shaft thus rotates the cam 176 causes actuation of lever 65 in a counterclockwise direction, whereupon release valve 44 (in the control valve device 12) will be seated and the supply valve 42 will be unseated. Therefore, were it not for an operation to be subsequently described fluid under pressure would be supplied from the main reservoir 14 to the chamber 39, and from thence would flow to the brake cylinder 10.

The flow from the main reservoir would be by way of pipe and passage 53, past the unseated valve 80 in the magnet valve portion 36, passage 54, and past the unseated supply valve 42. The flow from chamber 39 to the brake cylinder 10 would be by way of pipe and passage 40, double check valve device 11, in which the slide valve 105 will be actuated to the left, and pipe 41.

Assuming now that the shaft 155 has been rotated far enough for contact segment 156 to be disengaged from contact fingers 159 and 160, and for contact segment 157 to engage at least contact fingers 161 and 162, it will be apparent that the vehicle driving motors will be disconnected from the trolley 170 and will then be connected in a dynamic braking circuit, which includes conductors 195, contacts 157, 161 and 162, resistance 196, conductor 197, resistance 198, and conductor 199. The vehicle driving motors will thus be operated as dynamic brakes. It will further be apparent that if the contact segment 157 engages either or both of fingers 163 and 164 that the amount of the resistance 196 in the circuit will be reduced, or wholly cut out, so that the degree of dynamic braking will be increased.

As current flows in the dynamic braking circuit through the resistor 198, the relay 33 will be energized and will close its contacts 200. Closing of these contacts energizes the suppression magnet valve section 36 of the control valve device 12, from a battery 205 through a circuit which includes conductor 201, contacts 200, conductor 202, contacts 112 of the switch device 15, conductor 203, the magnet valve section 36, and ground connection 204.

The magnet valve section 36 will immediately be energized to seat its valve 80. Seating of this valve closes the communication between the main reservoir 14 and the seat of the supply valve 42 in the self-lapping valve section 35. Thus fluid under pressure is prevented from being supplied to the brake cylinder 10 so long as relay 33 is energized.

At the time the vehicle motors were connected in a dynamic braking circuit, contact finger 158 engaged the three contact fingers 165, 166 and 167. Engagement with fingers 165 and 166 establishes a circuit to the magnet valve device 25, from the battery 205, through a circuit which includes conductor 206, contact fingers 165 and 166, conductor 207, magnet valve device 25, and ground connection 208. Magnet valve device 25 will then actuate its double beat valve 148 to lower seated position, to vent the chamber 146 in the raising cylinder 24. The track brake device 22 will then drop by gravity to engagement with the track rail.

At the same time, engagement of segment 158 with fingers 165 and 167 establishes a circuit from the battery 205 to the track brake device 22, which beginning at finger 165 includes finger 167, resistance 209, conductor 210, the track brake device 22, and ground connection 211. If the segment 158 engages one or both of fingers 168 and 169 the resistance 209 will be partially or wholly cut out, so as to increase the degree of energization of the winding in the track brake device 22.

It will thus be obvious from the foregoing description that when the shaft 155 is rotated to a degree sufficient to apply both the dynamic and track brakes that the fluid pressure brakes will be suppressed, and will be applied only when the dynamic braking decreases sufficiently for relay 33 to open contacts 200, as near the end of the stop.

It should be further apparent that the degree of braking may be varied by varying the degree to which the service foot pedal 31 is depressed. If the foot pedal 31 is depressed to its limit the dynamic and track brakes will be applied to their maximum degree, while at the same time a finger 212 attached to the sheave or pulley 185 engages the stem 115 in the sanding valve device 16 and unseats the valve 113. Unseating of this valve supplies fluid under pressure from the main reservoir pipe 102 to the sanding pipe 116 to effect a deposit of sand on the rail. This increases the adhesion between the wheels and rails so as to prevent, or at least minimize the danger of, wheel sliding.

When it is desired to effect a release of the brakes, the foot pedal 31 is permitted to return to its release position, which is that shown in Fig. 1, whereupon spring 187 will return the shaft 155 to its release position. Both the dynamic and track brakes will then be released and the parts will assume the positions shown in Fig. 1.

The track brake device 22 has been shown as held suspended in its inoperative or release position above the rail by a raising cylinder, and lowered to the rail by venting the cylinder. It is to be understood, however, that the invention is not limited to this particular arrangement, but that the track brake device may be held suspended above the rail on springs and attracted to the rail upon energization thereof. Or as another alternative, the track brake device may be held suspended above the rail by springs and actuated toward or into engagement with the rail by electromagnets or similar devices. All of these methods of suspension and actuation of the track brake device into engagement with the rail are well known in the art and have been heretofore employed.

Emergency application

When it is desired to effect an emergency application of the brakes, pressure manually applied to one or both of the handle 134 and foot pedal 122 is released, to permit both of these elements to be actuated by their associated springs to their uppermost position.

In the hand valve device 18, the upward movement of the handle 134 effects seating of the valve 132, to close communication between the main reservoir branch pipe 128 and the upper portion of the safety control pipe 126, while the diaphragm valve 135 moves away from its seat to establish a communication between the safety control pipe 126 and exhaust port 136.

In the foot valve device 17, the upward movement of the foot pedal 122 effects seating of the supply valve 117 and unseating of the diaphragm valve 119. Unseating of the supply valve 117 cuts off communication between the main reservoir branch pipe 128 and the lower portion of the safety control pipe 126, while unseating of the diaphragm valve 119 connects the two portions of the safety control pipe 126, so that the whole safety control pipe is vented to the atmosphere by way of the exhaust port 136 in the hand valve device 18.

As the pressure of fluid in the safety control pipe diminishes due to this venting, the piston 74 in the control valve device 12 will move downwardly under action of spring 77. The latch member 72 will then engage the lower end of the arm 79 and actuate the plunger 58 to its extreme uppermost position. This will position the parts to supply fluid under pressure to the pressure chamber 39 to a maximum degree.

At the same time, as piston 74 moves downwardly it closes the communication from the piston chamber 85 in the emergency valve section 37 to the atmosphere, and connects the piston chamber 85 to the pressure chamber 39.

Since now the communication from the main reservoir 14 to the seat of supply valve 42 is open, fluid under pressure flows to chamber 39, and from thence to both the brake cylinder 10 and to the piston chamber 85. The pressure of fluid in the piston chamber 85 actuates piston 84 upwardly, and shifts double beat valve 82 to its upper seated position. This establishes a communication between the emergency reservoir 13 and pipe and passage 93 leading to the fluid pressure operated device 32. Fluid under pressure then flows from emergency reservoir 13 through pipe and passage 91, past the open lower seat of double beat valve 82, through chamber 92, pipe and passage 93, to chamber 181 in the fluid pressure operated device 32.

Piston 180 in this device is then actuated downwardly, and rod 183 engages the roller 175 carried by the arm 184 to actuate shaft 155 to its extreme clockwise or emergency position. The controller device 30 is then actuated to emergency position to effect an application of both the dynamic and magnetic track brakes to a maximum degree, as heretofore described.

When the safety control pipe 126 was vented to the atmosphere the pressure in chamber 109 of the switch device 15 was correspondingly reduced so that contacts 112 are opened. Opening of these contacts prevents energization of the suppression magnet valve section 36 upon application of the dynamic brakes.

Thus during an emergency application the fluid pressure brakes, the dynamic brakes, and the magnetic track brakes are all applied to a maximum degree.

Since the chamber 181 in the fluid pressure operated device 32 is in restricted communication with the atmosphere by way of choke 193, it will be obvious that after a predetermined length of time, which is made long enough to insure that the vehicle will be stopped, the pressure in the emergency reservoir 13 and chamber 181 will diminish to a value such that spring 182 will return the piston 180 to the position shown in Fig. 1, and thereby effect a release of the dynamic and magnetic track brakes.

To recharge the safety control pipe 126 pressure is again manually applied to the handle 134 or the foot pedal 122, whereupon the parts of the control valve device 12 will assume the position shown in Fig. 2, to release the fluid pressure brakes.

Derail throwing application

When the vehicle approaches an open derail switch and it is desired to close the switch so that the vehicle may pass, the vehicle is brought to a stop by effecting an application through operation of the derail throwing brake valve device 19. The handle 142 of this device is turned to application position to establish the communication shown in Fig. 3. The main reservoir pipe 101 is thus connected to the application pipe 141 to supply fluid under pressure to the brake cylinder 10, the slide valve 105 in the double check valve device 11 being shifted to its right hand position.

At the same time, the foot pedal 31 is permitted to remain in its release position, so that the controller device 30 does not isolate the vehicle driving motors from the trolley 170. The operator then operates the motor controller 28 to supply power to the vehicle driving motors. The current which flows from the trolley and through ground connection 174 to the track rails flows through an electromagnet in the derail switch, and the action of this electromagnet closes the derail switch.

The operator then effects a release of the fluid pressure brakes by turning the derail throwing brake valve handle 142 back to release position. The vehicle may then pass the derail switch.

It will thus be seen that when effecting a derail throwing application the fluid pressure brakes only are applied by operation of an auxiliary application means. It is to be noted that if at any time the main reservoir pipe 101 should become ruptured, cut-off valve 98 will seat to prevent loss of pressure below a chosen value, as hereinbefore described.

Figure 4:
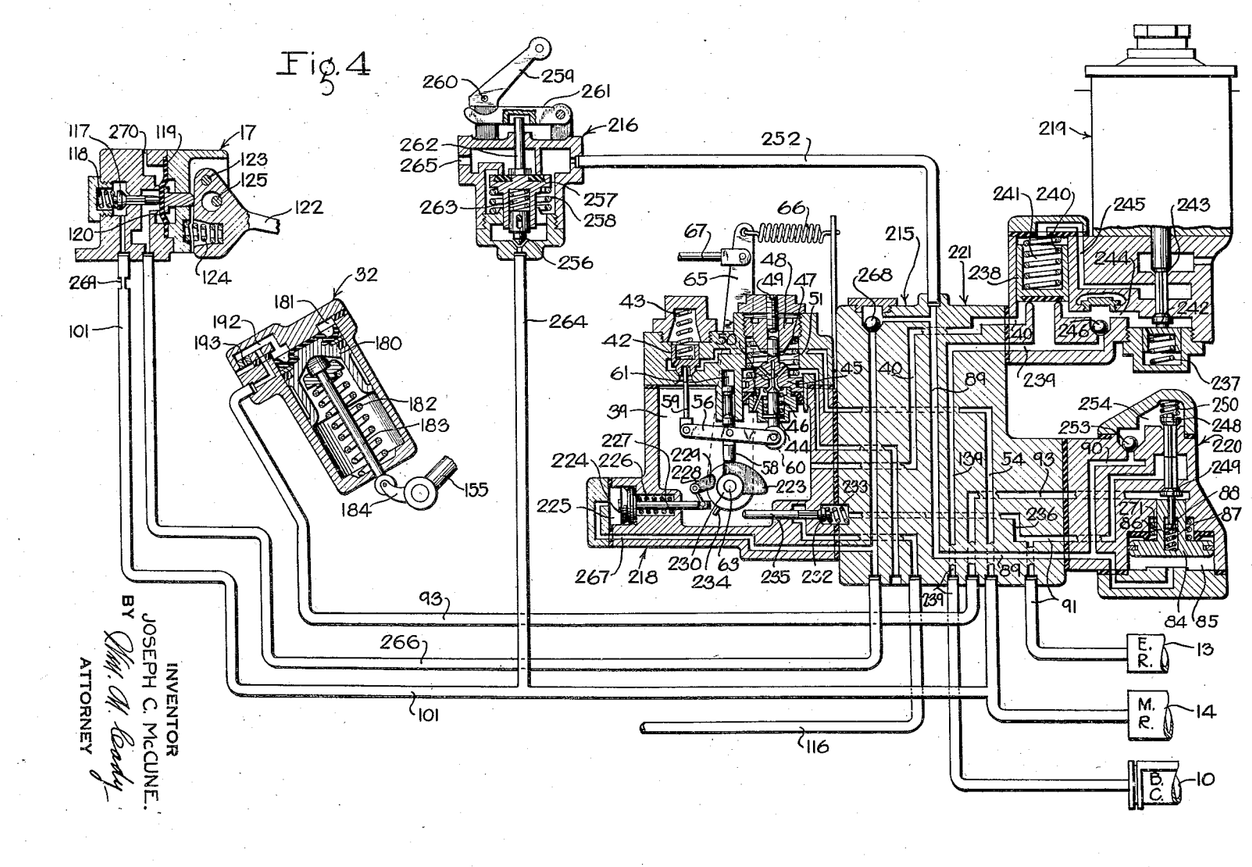
Fig. 4 shows in schematic and diagrammatic form a modification of the fluid pressure brake system shown in Fig. 1.

Modification shown in Fig. 4

This modification deals with the fluid pressure brake portion only of the equipment shown in Fig. 1, and illustrates an arrangement for providing functions not present in the equipment illustrated in Fig. 1. It is to be understood, however, that the modified fluid pressure brake system shown in Fig. 4 is intended to operate in conjunction with the dynamic brake and magnetic track brake systems illustrated in Fig. 1, in substantially the manner described in connection with that figure.

In the system illustrated in Fig. 4, the emergency reservoir 13, main reservoir 14, brake cylinder 10, foot valve device 17, and fluid pressure operated device 32 of Fig. 1 are retained. The control valve device 12 of Fig. 1 is replaced by the control valve device 215, while a conductor's valve device 216 has been added to the system. The other fluid pressure brake devices illustrated in Fig. 1 and not shown in Fig. 4 have been or may be omitted, or incorporated in the new control valve device 215.

The control valve device 215 comprises a self-lapping valve portion 218, a suppression magnet valve portion 219, an emergency valve portion 220, and a pipe bracket portion 221, which sections are similar to the corresponding sections of the control valve device 12.

The parts of the self-lapping valve section 218 which correspond to the self-lapping valve section 35 of Figs. 1 and 2 are similarly numbered in Fig. 4. In Fig. 4 a cam 223 secured to the shaft 63 has replaced the arm 62 of Fig. 2. This cam 223 is designed to actuate the plunger 58 upwardly in the same manner as the arm 62.

The piston 74 of Fig. 2, and the mechanism associated therewith, have been omitted and replaced in Fig. 4 by a holding mechanism comprising a piston 224 disposed in a chamber 225 and urged toward the left by a spring 226. The piston 225 has associated therewith a stem 227 which is adapted to rock a bell crank lever 228, one arm of which comprises a cam 229 adapted to engage a collar 230 secured to the shaft 63.

When fluid under pressure to a predetermined degree is supplied to and maintained in the chamber 225 the piston 224 is positioned as shown in Fig. 4, in which case the cam 229 is maintained out of engagement with the collar 230. When fluid under pressure in chamber 225 is released or diminished, spring 226 actuates piston 224 to the left and thereby causes cam 229 to engage the collar 230. If in the meanwhile the shaft 63 has been rotated to a position corresponding to an application position the cam 229 will act as a wedge and hold the shaft 63 in this application position until fluid under pressure is again supplied to chamber 225 to a degree sufficient to disengage cam 229 from the collar 230.

The self-lapping section has also incorporated therein a sanding valve 232 which is urged toward seated position by a spring 233 and is adapted to be unseated by engagement of a finger 234, rotatable with the shaft 63, with valve stem 235. When unseated the valve 232 establishes communication between emergency reservoir 13 and a sanding pipe 116, referred to in the embodiment of Fig. 1, the communication being established by way of pipe and passage 91, and passage 236.

The suppression magnet valve section 219 is similar in function to the suppression magnet valve section 36 of Fig. 1, except that in Fig. 4 a relay valve 238 has been included to increase the flow capacity through this section. It will also be noted that whereas in the embodiment of Fig. 1, and as specifically illustrated in Fig. 2, the suppression magnet valve section is disposed between the main reservoir 14 and the self-lapping portion 25, the suppression magnet valve section 219 of Fig. 4 is disposed between the self-lapping section 218 and the brake cylinder 10.

The relay valve 238 controls communication between passage 40 leading to chamber 39 of the self-lapping section, and pipe and passage 239 leading to brake cylinder 10. The valve 238 is urged toward a seated position by a light spring 240, and may be unseated by the pressure of fluid therebelow when this pressure exceeds that existing in chamber 241 above the valve.

The pressure of fluid in the chamber 241 is controlled by a supply valve 242 and a release valve 243. A spring 237 urges the supply valve 242 to seated position and the release valve 243 to unseated position, while an electromagnet in the upper part of the valve device casing operates when energized to seat the release valve 243 and unseat the supply valve 242. When the release valve is seated and the supply valve unseated, fluid under pressure may flow from passage 40, through passage 244, past the unseated valve 242, and through passage 245 to chamber 241. A ball check valve 246 prevents flow to the brake cylinder 10, but permits a release of fluid under pressure from the brake cylinder when relay valve 238 is seated. When the pressure in chamber 241 is substantially equal to that in passage 40, spring 240 will seat the valve 238.

When supply valve 242 is seated and release valve 243 is unseated, chamber 241 is vented to the atmosphere, whereupon the pressure in passage 40 may unseat valve 238 and fluid under pressure thereby flow to the brake cylinder 10.

The emergency valve section 220 in Fig. 4 is similar to that illustrated in Fig. 2, except that the double beat valve 62 has been replaced by two valves 248 and 249 having fluted stems arranged in abutting relationship, the valve 248 being urged to seated position and the valve 249 to unseated position by a spring 250.

The emergency valve section of Fig. 2 operated upon an increase of pressure in the chamber 85 whereas the emergency valve section of Fig. 4 operates upon a decrease of pressure in chamber 85. The valves 248 and 249 are therefore normally positioned as shown in Fig. 4 when fluid under pressure is supplied to and maintained in the piston chamber 85, and are operated to seated and unseated positions respectively upon decrease of pressure in this chamber.

The piston chamber 85 is in communication by way of the aforedescribed passage 89 with a charging pipe 252, and is also in communication with the aforedescribed passage 90 which leads by way of ball check valve 253 to chamber 254 above the valve 248. It will thus be seen that when the valve 248 is maintained unseated, the emergency reservoir 13 is charged from the charging pipe 252, by way of passages 89 and 90, past ball valve 253, chamber 254, past the unseated valve 248, and pipe and passage 91.

The conductor's valve device 216 is embodied in a casing provided with a charging valve 256 and a vent valve 257. A spring 258 urges the vent valve 257 toward seated position while at the same time urging the charging valve 256 to unseated position.

For seating the charging valve 256 and unseating the vent valve 257, there is provided a lever 259 which is pivotally rotatable about a fulcrum 260 to actuate an arm 261 downwardly. Downward movement of the arm 261 engages stem 262 to unseat the vent valve 257. Unseating of this valve effects seating of the charging valve 256 through a spring 263 which permits relative movement between the two valves.

When the release valve 257 is seated and the charging valve 256 is unseated a communication is established between the main reservoir pipe 101 and the charging pipe 252, by way of branch pipe 264. When the charging valve 256 is seated and the vent valve 257 unseated this communication is cut off and the charging pipe 252 is vented to the atmosphere through an exhaust port 265.

In the embodiment of Fig. 1 a safety control pipe was provided which connected to the foot valve device 17 and to the control valve device 12 of that embodiment. In the embodiment of Fig. 4 the safety control pipe has been omitted and a locking pipe 266 is provided which connects to the foot valve device 17 and to the control valve device 215. In the control valve device 215 the locking pipe is in communicaton with the aforedescribed chamber 225, by way of passage 267, and is also in communication with the passage 89 leading to the charging pipe 252, by way of ball check valve 268.

The operation of this modified form of my invention is as follows:

Operation of modification of Fig. 4

When the vehicle is running under power, or coasting, the operator maintains pressure manually applied to the foot pedal 122 of the foot valve device 17. This maintains the diaphragm valve 119 seated and the supply valve 117 unseated. The locking pipe 266 is then maintained in communication with the main reservoir pipe 101 by way of choke 269, so that the locking pipe 266 is charged to main reservoir pressure. The pressure in chamber 225 in the control valve device 215 then corresponds to locking pipe pressure.

At the same time, the main reservoir pipe 101 is maintained in communication with the charging pipe 252 through the conductor's valve device 216, in which the parts will be in the positions as shown for this condition. The pressure in piston chamber 85 of the emergency valve portion 220 will then also correspond to main reservoir pressure, and the emergency reservoir 13 will be charged past the unseated valve 248 from the main reservoir 14.

A service application of the brakes is effected by depressing the service foot pedal 31, in which case the dynamic brakes and magnetic track brakes will be applied and the fluid pressure brakes will be suppressed by energization of the suppression magnet valve section 219 in the control valve device 215. As has been previously described, energization of the suppression magnet valve section will cause relay valve 238 to remain seated, so that operation of the self-lapping valve section 218 due to rotation of shaft 155 will not result in the supply of fluid under pressure to the brake cylinder 10.

The functioning of the modified form of brake equipment from this point on is substantially the same as that described in connection with the embodiment of Fig. 1.

When the vehicle has been brought to a stop, if for any reason the operator desires to leave his station or requires the use of his feet for other functions, he may release pressure manually applied to the foot pedal 122, in which case the locking pipe 266 will be disconnected from the main reservoir pipe 101 and be connected to an exhaust port 270. The locking pipe 266 will be thus vented to the atmosphere, and the resulting decrease of pressure in chamber 225 in the control valve device will permit piston 224 to move to the left, and by engagement of cam 229 with collar 230 lock the self-lapping valve portion 218 in the application position to which it has been previously actuated by manipulation of service foot pedal 31.

It is to be noted that reducing the pressure in the locking pipe 266 does not result in reducing the pressure in the piston chamber 85 of the emergency valve portion because of the presence of the ball check valve 268 in the communication between the locking pipe and this piston chamber.

When pressure is again manually applied to the foot pedal 122 the holding function performed by the cam 229 will be terminated so that a release of the brakes may be effected by returning the service foot pedal 31 to its release position.

In the embodiment of Fig. 1 an emergency application of the brakes was effected by simultaneously releasing pressure manually applied to the handle 134 and the foot pedal 122. In the embodiment of Fig. 4, an emergency application is effected by rotary movement of the lever 259 in the conductor's valve device 216. As previously described, this vents the charging pipe 252, which thereby reduces the pressure in the piston chamber 85. Piston 84 then moves downwardly under action of spring 271 to seat the valve 248 and unseat valve 249. Seating of valve 248 closes the charging connection between the main reservoir 14 and emergency reservoir 13, while unseating of valve 249 connects the emergency reservoir to pipe and passage 93 leading to the fluid pressure operated device 32.

This device 32 then rotates shaft 155 to its emergency position, to condition each of the brake systems for an application to a maximum degree. However, since in the embodiment of Fig. 4 there is no switch device to open the circuit to the suppression magnet valve section 219, this magnet valve will be energized to suppress the fluid pressure brakes while the dynamic and track brakes will be applied to a maximum degree. In this respect therefore the operation is different from that previously described for the embodiment of Fig. 1. The fluid pressure brakes will therefore not be applied until the dynamic brakes decrease in effectiveness near the end of the stop.

When the self-lapping portion 218 is actuated to emergency position, finger 234 engages stem 235 of the sanding valve 232, to also connect the emergency reservoir 13 to the sanding pipe 116, so as to cause sand to be deposited on the rails.

If the charging pipe 252 is maintained vented, the gradual escape or loss of fluid under pressure through choke 193 in the fluid pressure operated device 32 will ultimately permit shaft 155 to be returned to its release position, to thereby effect a release of the brakes.

In the embodiment of Fig. 1 the suppression magnet valve device is interposed between the main reservoir and the self-lapping portion of the control valve device. By this arrangement a smaller suppression magnet valve section may be employed, and fast applications and release of the brakes still obtained, because main reservoir pressure is available to force flow through the magnet valve device while the self-lapping portion has supply and release ports large enough to permit rapid supply to and release from the brake cylinder.

In the embodiment of Fig. 4, the suppression magnet valve device is interposed between the self-lapping portion and the brake cylinder. When this is done it is necessary to employ the relay valve 238 in conjunction therewith in order to obtain the necessary flow capacity for fast applications and release. This location of the magnet valve device is desirable from the standpoint of avoiding any possible effect on the operation of the self-lapping portion due to presence of the suppression magnet valve device in the supply line thereto.

While I have illustrated and described my invention with reference to one embodiment and one modification thereof, it is not my intention to be limited to the details of these or otherwise than by the spirit and scope of the appended claims herewith.

Having now described my invention, what I claim as new and desire to secure by Letters Patent, is:

1. In a vehicle brake system, in combination, fluid pressure brake means, dynamic brake means, magnetic track brake means, common control means for controlling applications of said three brake means, and fluid pressure means comprising a movable abutment subject on one side to pressure of fluid supplied to a chamber and on the other side to pressure of a spring, said abutment being connected to and being adapted to actuate said common control means upon supply of fluid under pressure to said chamber.

2. In a vehicle brake system, in combination, a brake cylinder, a magnetic track brake device, vehicle driving motors adapted to be connected to operate as dynamic brakes, a brake valve device operable to establish a communication through which fluid under pressure is supplied to said brake cylinder, control means for controlling the supply of current to said magnetic track brake device and for connecting said vehicle motors in a dynamic braking circuit, and means operated upon an increase in fluid pressure for operating said brake valve device and said control means.

3. In a vehicle brake system, in combination, fluid pressure brake means, dynamic brake means, magnetic track brake means, a brake valve device for establishing a communication through which fluid under pressure is supplied to effect an application of said fluid pressure brake means, electric control means for controlling applications of said dynamic and track brake means, common means for actuating said brake valve device and said electric control means, manually operated means adapted to be operated in effecting applications of said brake means for actuating said common means, and fluid pressure operated means operated upon a variation of fluid pressure therein for also actuating said common means.

4. In a vehicle brake system, in combination, fluid pressure brake means, electric brake means, means for establishing a communication through which fluid under pressure is supplied in effecting an application of said fluid pressure brake means, a first circuit in which current flows when application of said electric brake means is effected, electroresponsive means operable when energized to close said communication, a second circuit adapted when closed to supply current to said electroresponsive means, normally open contacts in said second circuit, and means responsive to current in said first circuit for closing said contacts.

5. In a vehicle brake system, in combination, fluid pressure brake means, electric brake means, a circuit in which current flows when said electric brake means is applied, resistance in said circuit, electroresponsive means operable when energized to prevent so long as energized an application of said fluid pressure brake means, a source of current supply, and means controlled by the voltage drop across said resistance for controlling connection of said electroresponsive means to said source.

6. In a vehicle brake system, in combination, fluid pressure brake means, electric brake means, electroresponsive means operable when energized to prevent an application of said fluid pressure brake means, a circuit for supplying current to said electroresponsive means, means responsive to the flow of current in said electric brake means for closing said circuit, and means operated upon a decrease in pressure for opening said circuit.

7. In a vehicle brake system, in combination, fluid pressure brake means, electric brake means, electroresponsive valve means operable when energized to prevent an application of said fluid pressure brake means, switch means governed by the effectiveness of said electric brake means for supplying current to a circuit leading to said electroresponsive valve means, and a separate switch means operated upon a decrease in pressure for opening said circuit.

8. In a vehicle brake system, in combination, fluid pressure brake means, means operable to effect an application of said fluid pressure brake means, electroresponsive valve means operable when energized to prevent said application of said brake means, and means operated upon a decrease in pressure for preventing energization of said electroresponsive means.

9. In a vehicle brake system, in combination, a brake cylinder, dynamic brake means, means for effecting an application of each of said brake means, electroresponsive valve means operable to suppress the application of said fluid pressure brake means so long as said electric brake means is effective above a chosen degree, and means operated upon a decrease in pressure for cutting said last means out of action to permit effective application of said fluid pressure brake means.

10. In a vehicle brake system, in combination, a brake cylinder, electric brake means, a brake valve device operable to effect a supply of fluid under pressure to said brake cylinder, a magnet valve device disposed between said brake valve device and said brake cylinder and operable when energized to prevent supply of fluid under pressure to said brake cylinder by operation of said brake valve device, and switch means governed by the effectiveness of said electric brake means for controlling energization of said magnet valve device, and operable when said effectiveness is above a chosen value to maintain said magnet valve device energized to a substantially constant degree, and when said effectiveness is below said chosen value to wholly deenergize said magnet valve device.

11. In a vehicle brake system, in combination, a brake cylinder, an electric brake device, a brake valve device operable to effect a supply of fluid under pressure from a reservoir to said brake cylinder, a magnet valve device disposed between said reservoir and said brake valve device and operable when energized to prevent supply of fluid under pressure from said reservoir to said brake cylinder, and switch means governed by the effectiveness of said electric brake means for controlling energization of said magnet valve device, and operable when said effectiveness is above a chosen value to maintain said magnet valve device energized to a substantially constant degree, and when said effectiveness is below said chosen value to wholly deenergize said magnet valve device.

12. In a vehicle brake system, in combination, fluid pressure brake means, vehicle motors adapted to be operated as dynamic brakes, common control means for effecting a supply of fluid under pressure to said fluid pressure brake means and for disconnecting said motors from the source of power supply and reconnecting said motors in a dynamic braking circuit, manually operated means for actuating said common control means, and separate manually operated means for effecting an application of said fluid pressure brake means only independently of actuation of said first mentioned manually operated means, whereby power may be supplied to said vehicle driving motors while said fluid pressure brake means is applied.

13. In a vehicle brake system, in combination, electric brake means, fluid pressure brake means, common control means for controlling applications of said aforementioned brake means, fluid pressure operated means for actuating said common control means, means normally subject to fluid under pressure and operated upon a decrease in said pressure for supplying fluid under pressure to operate said fluid pressure operated means, and means for establishing at all times an unrestricted communication through which said fluid flows to said fluid pressure operated means.

14. In a vehicle brake system, in combination, fluid pressure brake means, magnetic track brake means, dynamic brake means, common control means for controlling applications of said three brake means, fluid pressure means operated upon supply of fluid under pressure thereto to actuate said common control means, a valve mechanism operated upon a decrease in pressure for supplying fluid under pressure to said fluid pressure means, and means establishing at all times an unrestricted communication through which said fluid flows to said fluid pressure operated means.

15. In a vehicle brake system, in combination, fluid pressure brake means, electric brake means, common control means for controlling applications of said two brake means, fluid pressure operated means operated upon a rapid supply of fluid under pressure thereto to actuate said common control means, a normally charged pipe, and a valve mechanism operated upon a decrease of pressure in said pipe for quickly effecting a supply of fluid under pressure to said fluid pressure operated means through a communication which is at all times open.

16. In a vehicle brake system, in combination, a brake cylinder, a magnetic track brake device, vehicle driving motors adapted to be operated as dynamic brakes, a brake valve device operable to establish a communication through which fluid under pressure is supplied to effect a supply of fluid under pressure to said brake cylinder, a controller device adapted when operated to effect a supply of current to said magnetic track brake device and to connect said vehicle motors in a dynamic braking circuit, common means for operating said brake valve device and controller device, fluid pressure operated means operated upon supply of fluid under pressure thereto quickly for actuating said common means, a pipe normally charged with fluid under pressure, and means including a device operated upon a decrease of pressure in said pipe for effecting a supply of fluid under pressure to said fluid pressure operated means at a rapid and unrestricted rate.

17. In a vehicle brake system, in combination, electric brake means, fluid pressure brake means, two independent control means for controlling applications of said aforementioned two brake means, fluid pressure operated means operated upon a rapid supply of fluid under pressure thereto for actuating both of said control means to effect an application of the brakes, and safety control means for controlling the supply of fluid under pressure to said fluid pressure operated means, and operative to supply fluid under pressure thereto at an unrestricted rate.

18. In a vehicle brake system, in combination, a brake cylinder, a magnetic track brake device, vehicle driving motors adapted to be connected in a dynamic braking circuit, a brake valve device operable to establish a communication through which fluid under pressure is supplied to said brake cylinder, a controller mechanism operable to supply current to said magnetic track brake device and to connect said vehicle driving motors in a dynamic braking circuit, common means for actuating said brake valve device and controller mechanism, fluid pressure operated means operated upon a rapid supply of fluid under pressure thereto to actuate said common means, a pipe normally charged with fluid under pressure, means operated upon a decrease of pressure in said pipe for supplying fluid under pressure quickly and at an unrestricted rate to said fluid pressure operated means, and safety control means operated upon a decrease of pressure manually applied thereto for effecting a reduction of pressure in said pipe.

19. In a vehicle brake system, in combination, magnetic track brake means, dynamic brake means, a controller mechanism operable to an application position to effect an application of said two brake means, fluid pressure operated means operated upon a rapid supply of fluid under pressure thereto for actuating said controller device, and means for supplying fluid under pressure to said fluid pressure operated means at an unrestricted rate.

20. In a vehicle brake system, in combination, magnetic track brake means, dynamic brake means, a controller mechanism operable to an application position to effect an application of said two brake means, fluid pressure operated means operated upon a rapid supply of fluid under pressure thereto for actuating said controller device, a pipe normally charged with fluid under pressure, and means operated upon a decrease of pressure in said pipe for effecting a supply of fluid under pressure to said fluid pressure operated means at an unrestricted rate.

21. In a vehicle brake system, in combination, vehicle driving motors adapted to be operated as dynamic brakes, control means adapted to be operated to disconnect said motors from a source of power supply and to connect said motor in a dynamic braking circuit, fluid pressure operated means for actuating said control means, a pipe normally charged with fluid under pressure, and means operated upon a reduction of pressure in said pipe for effecting a supply of fluid under pressure to said fluid pressure operated means at an unrestricted rate.

22. In a vehicle brake system, in combination, magnetic track brake means, dynamic brake means, a controller mechanism operable to application position to effect an application of said two brake means, manually operated means for manually actuating said controller mechanism, and fluid pressure operated means for independently actuating said controller mechanism.

23. In a vehicle brake system, in combination, magnetic track brake means, dynamic brake means, a controller mechanism for controlling applications of said two brake means, a movable abutment subject on one side to pressure of fluid supplied to a chamber and on the other side to pressure of a spring, and being adapted upon a rapid supply of fluid under pressure to said chamber to actuate said controller device to application position, and means establishing a constant unrestricted communication between said chamber and the atmosphere.

24. In a vehicle brake system, in combination, a magnetic track brake device, vehicle driving motors adapted to be operated as dynamic brakes, said motors having power supplied thereto from a trolley when operating as driving motors, a battery, and a control mechanism operable to application position to disconnect said driving motors from said trolley, to also connect said driving motors in a dynamic braking circuit, and to also connect said track brake device to said battery.

25. In a vehicle brake system, in combination, fluid pressure brake means, a pipe normally charged with fluid under pressure, a valve mechanism connected to said pipe and operative upon a decrease of pressure in said pipe for effecting a supply of fluid under pressure to said brake means, a valve device adapted to be located at the control station of the vehicle for varying the pressure in said pipe, said valve device being operable in a release position to open a communication through which fluid under pressure is supplied to said pipe, and a second valve device remote from said control station and also operable in a release position to open a communication through which fluid under pressure is supplied to said pipe, and operable in an application position to close said communication and to open a second communication through which fluid under pressure is released from said pipe.

26. In a vehicle brake system, in combination, electric brake means, fluid pressure brake means, a pipe normally charged with fluid under pressure, a valve mechanism connected to said pipe and operated upon a decrease of pressure in said pipe for effecting an application of said two brake means, a primary valve device normally under the control of an operator when in the regular control station of the vehicle for varying the pressure in said pipe, and operable when in a release position to effect charging of said pipe, and a second valve device remotely located from said control station and having two positions, one a position in which said pipe is open to a source of fluid under pressure, and the other in which said communication is closed and said pipe is open to an atmospheric port.

JOSEPH C. McCUNE.